DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 31, 1970

872 O.G. 1411

T872,012

PROCESS OF SOLVENT POLISHING PLASTIC MOLDED ARTICLES

Clay D. Holt, P.O. Box 511, Kingsport, Tenn. 37662

Continuation of application Ser. No. 684,537, Nov. 20, 1967. This application Oct. 20, 1969, Ser. No. 867,969

Int. Cl. B29c *25/00;* B44d *5/10*

U.S. Cl. 264—341

No Drawing. 11 Pages Specification

Plastic articles are smoothed and polished by applying a mixture of low and high boiling components and oven heating. Neither component is a solvent until the article is heated. As the low boiling component boils away, it removes surface blemishes while the high boiling component keeps the surface soft and flowable until all blemishes disappear. Injection molded cellulose acetate (CA), or its propionate (CAP) or butyrate (CAB) with flaws, mold flash and surface strain may be treated with a liquid of 80 to 99% low boiling solvent (200° F., or lower) and 20 to 1% higher boiling solvent (over 200° F., up to 350° F.) by dipping, spraying, roller, or brush at or below 75° F. After contact for 20 sec. to 4 min., excess solvent may be spun off and the article is placed in an oven for 1 to 4 min. at or above the boiling point of the lowest boiling solvent (190° to 300° F.). Examples are: (1) CAB with toluene 90%, tetrachloroethylene 5%, tributyrin 5%, one min. at room temp. (RT), two min. at 250° F.; (2) CAB with trichloroethylene 98%, ethylene glycol diacetate 2%, three min. at RT, three min. at 195°; (3) CAP with trichloroethylene 90%, ethylene glycoldiacetate 10%, three min. at RT, three min. at 195° F.; (4) CA with trichloroethylene 90%, methyl "Cellosolve" acetate 10%, two min. RT, three min. at 195° F. Xylene and naphthylene/triacetin are other, low/high boilers respectively.